US007000392B2

(12) United States Patent
Greentree

(10) Patent No.: US 7,000,392 B2
(45) Date of Patent: Feb. 21, 2006

(54) VANE CONTROL

(75) Inventor: Christopher Greentree, Redondo Beach, CA (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 11/011,211

(22) Filed: Dec. 13, 2004

(65) Prior Publication Data

US 2005/0193731 A1  Sep. 8, 2005

Related U.S. Application Data

(62) Division of application No. 10/796,784, filed on Mar. 8, 2004.

(51) Int. Cl.
F02D 41/04  (2006.01)
F02D 41/10  (2006.01)
F02D 23/00  (2006.01)
F02B 37/24  (2006.01)
G06F 17/00  (2006.01)

(52) U.S. Cl. .................... 60/602; 60/611; 123/559.1; 123/564; 701/100

(58) Field of Classification Search ............... 60/602, 60/611; 123/559.1, 564; 415/150, 157, 415/158, 160, 163, 164; 417/407; 701/100
See application file for complete search history.

(56) References Cited

U.S. PATENT DOCUMENTS

| 5,815,091 | A | 9/1998 | Dames et al. | |
|---|---|---|---|---|
| 6,269,642 | B1 | 8/2001 | Arnold et al. | |
| 6,679,057 | B1 * | 1/2004 | Arnold | 60/602 |
| 2003/0185672 | A1 * | 10/2003 | Suganami et al. | 415/150 |
| 2004/0194464 | A1 * | 10/2004 | Ando et al. | 60/602 |
| 2005/0005605 | A1 * | 1/2005 | Ando et al. | 60/602 |
| 2005/0022524 | A1 * | 2/2005 | Ando et al. | 60/602 |

FOREIGN PATENT DOCUMENTS

EP  1304462 A2 *  4/2003

* cited by examiner

Primary Examiner—Sheldon J Richter
(74) Attorney, Agent, or Firm—Chris James

(57) ABSTRACT

An exemplary controller includes a control valve that includes an electric actuator operatively coupled to a valve stem, a piston operatively coupled to one or more hydraulic fluid paths controlled by the control valve and including a piston shaft, a rotatable shaft operatively coupled to the piston shaft and mechanically isolated from the valve stem and capable of adjusting geometry of the variable geometry turbine, and an electronic sensor capable of sensing an angular position of the rotatable shaft. Various other exemplary systems, methods, devices, etc., are also disclosed.

14 Claims, 11 Drawing Sheets

EXEMPLARY CONTROL SYSTEM AND METHOD

VARIABLE GEOMETRY TURBINE
CENTER HOUSING

CONTROL SYSTEM

EXEMPLARY CONTROL SYSTEM

EXEMPLARY VARIABLE GEOMETRY TURBINE
CENTER HOUSING WITH OIL CONTROL VALVE

EXEMPLARY POSITION SENSOR

VARIABLE GEOMETRY TURBINE
CENTER HOUSING AND EXEMPLARY SENSOR

EXEMPLARY SENSORS AND ELECTRONICS

VANE CONTROL

This application is a divisional of and claims priority to a copending U.S. patent application bearing Ser. No. 10/796,784, filed on Mar. 8, 2004.

TECHNICAL FIELD

Subject matter disclosed herein relates generally to sensing or controlling vane position for a variable geometry turbine.

BACKGROUND

Recently, a variety of variable geometry turbochargers (VGTs), that aim to address boost issues, have become available. VGTs, such as, but not limited to, the GARRETT® VNT™ and AVNT™ turbochargers (Garrett Corporation, California), use adjustable vanes, nozzles or the like, to control exhaust flow across a turbine. For example, GARRETT® VNT™ turbochargers adjust the exhaust flow at the inlet of a turbine in order to optimize turbine power with the required load or other conditions. Movement of vanes towards a closed position typically directs exhaust flow more tangentially to the turbine, which, in turn, imparts more energy to the turbine and, consequently, increases compressor boost. Conversely, movement of vanes towards an open position typically directs exhaust flow more radially to the turbine, which, in turn, reduces energy to the turbine and, consequently, decreases compressor boost. Thus, at low engine speed and small exhaust gas flow, a VGT turbocharger may increase turbine power and boost pressure; whereas, at full engine speed/load and high gas flow, a VGT turbocharger may help avoid turbocharger overspeed and help maintain a suitable or a required boost pressure.

A variety of control schemes exist for controlling geometry in variable geometry turbines. However, such schemes often exhibit time lags, hysteresis, and other characteristics that can compromise or limit geometry control. Thus, a need exists for new control schemes that can overcome such limitations. Methods, devices, systems, etc., for sensing and/or controlling geometry in variable geometry turbines are described below.

BRIEF DESCRIPTION OF THE DRAWINGS

A more complete understanding of the various methods, devices, systems, etc., described herein, and equivalents thereof, may be had by reference to the following detailed description when taken in conjunction with the accompanying drawings wherein.

DETAILED DESCRIPTION

Figure 1:
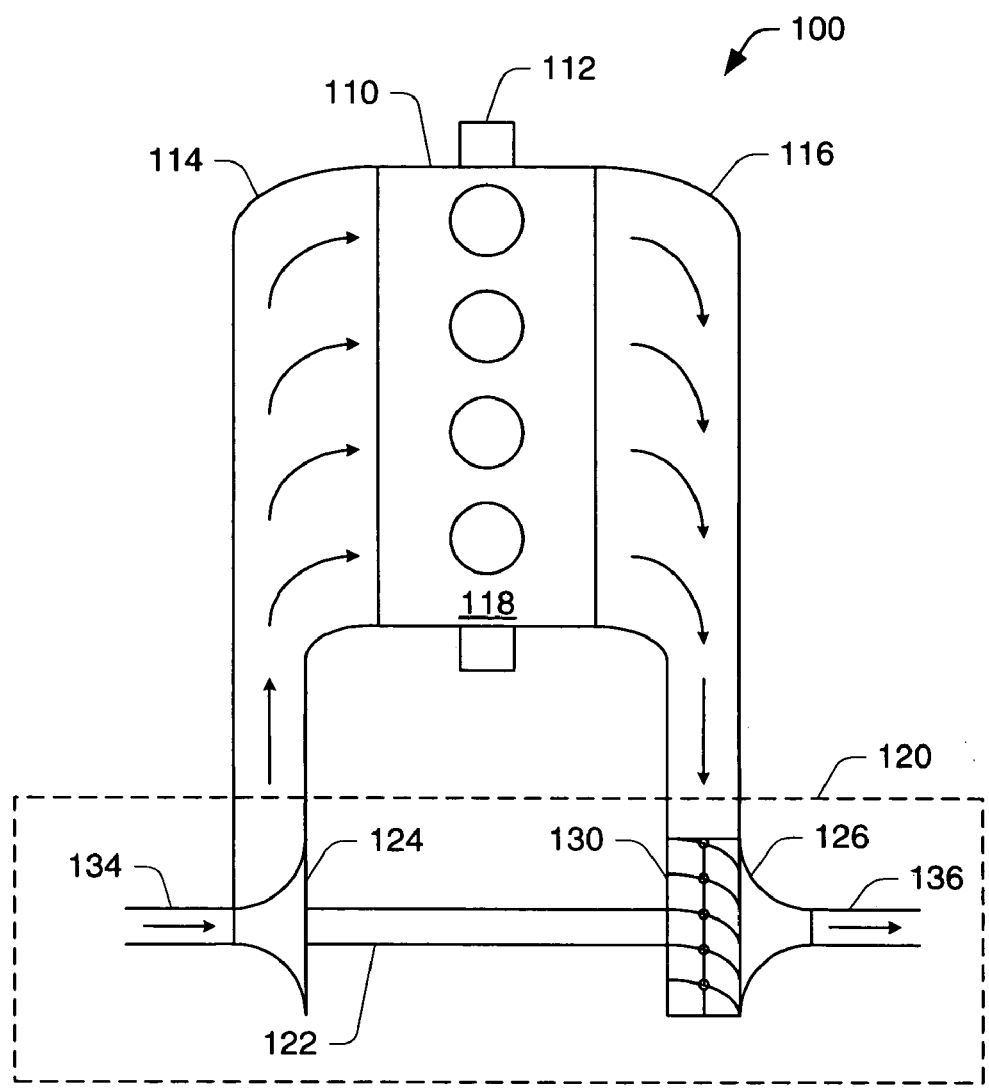
FIG. 1 is a simplified approximate diagram illustrating a turbocharger having a variable geometry unit and an internal combustion engine.

Turning to the drawings, wherein like reference numerals refer to like elements, various methods are illustrated as being implemented in a suitable control and/or computing environment. Although not required, various exemplary methods are described in the general context of computer-executable instructions, such as program modules, being executed by a computer and/or other computing device. Generally, program modules include routines, programs, objects, components, data structures, etc. that perform particular tasks or implement particular abstract data types.

In some diagrams herein, various algorithmic acts are summarized in individual "blocks". Such blocks describe specific actions or decisions that are made or carried out as a process proceeds. Where a microcontroller (or equivalent) is employed, the flow charts presented herein provide a basis for a "control program" or software/firmware that may be used by such a microcontroller (or equivalent) to effectuate the desired control. As such, the processes are implemented as machine-readable instructions storable in memory that, when executed by a processor, perform the various acts illustrated as blocks. In addition, various diagrams include individual "blocks" that are optionally structural elements of a device and/or a system. For example, a "controller block" optionally includes a controller as a structural element, an "actuator block" optionally includes an actuator as a structural element, a "turbocharger block" optionally includes a turbocharger as a structural element, etc. In various blocks, structure and function are implied. For example, a controller block optionally includes a controller (e.g., a structure) for controlling boost (e.g., a function).

Those skilled in the art may readily write such a control program based on the flow charts and other descriptions presented herein. It is to be understood and appreciated that the subject matter described herein includes not only devices and/or systems when programmed to perform the acts described below, but the software that is configured to program the microcontrollers and, additionally, any and all computer-readable media on which such software might be embodied. Examples of such computer-readable media include, without limitation, floppy disks, hard disks, CDs, RAM, ROM, flash memory and the like.

Turbochargers are frequently utilized to increase the output of an internal combustion engine. Referring to FIG. 1, an exemplary system 100, including an exemplary internal combustion engine 110 and an exemplary turbocharger 120, is shown. The internal combustion engine 110 includes an engine block 118 housing one or more combustion chambers that operatively drive a shaft 112. As shown in FIG. 1, an intake port 114 provides a flow path for combustion gas (e.g., air) to the engine block 118 while an exhaust port 116 provides a flow path for exhaust from the engine block 118.

The exemplary turbocharger 120 acts to extract energy from the exhaust and to use this energy to boost intake charge pressure (e.g., pressure of combustion gas). As shown in FIG. 1, the turbocharger 120 includes a combustion gas inlet 134, a shaft 122, a compressor 124, a turbine 126, a variable geometry unit 130, and an exhaust outlet 136. The variable geometry unit 130 optionally has features such as those associated with commercially available variable geometry turbochargers (VGTs), such as, but not limited to, the GARRETT® VNT™ and AVNT™ turbochargers, which use multiple adjustable vanes to control the flow of exhaust through a nozzle and across a turbine. As shown, the variable geometry unit 130 is optionally positioned at, or proximate to, an exhaust inlet to the turbine 126. Exhaust from the engine 110 diverted to the turbine 126 causes the shaft 122 to rotate, which, in turn, rotates the compressor 124. When rotating, the compressor 124 energizes combustion gas (e.g., ambient air) to produces a "boost" in combustion gas pressure (e.g., force per unit area or energy per unit volume), which is commonly referred to as "boost pressure." In this manner, a turbocharger may help to provide a larger mass of combustion gas (typically mixed with a carbon-based and/or hydrogen-based fuel) to the engine, which translates to greater engine output during combustion.

Figure 2A:
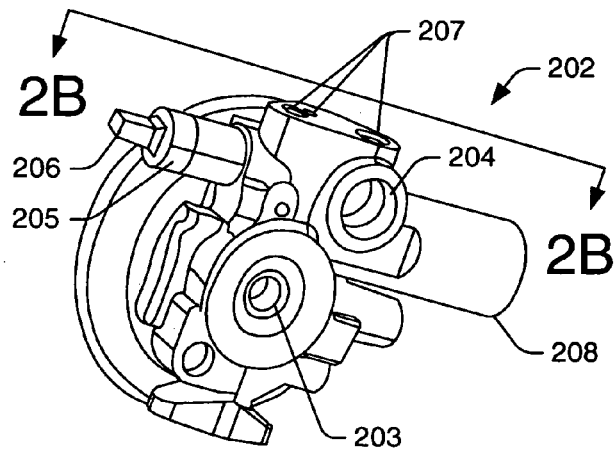
FIG. 2A is a perspective view of a center housing for a variable geometry turbine.

FIG. 2A shows a perspective view of a center housing 202 for a variable geometry turbine. This particular view shows the back side of the center housing 202, i.e., the side opposite the turbine wheel. Many variable geometry turbine, turbocharger systems include such a center housing disposed between the turbocharger's turbine wheel and compressor wheel. In general, a turbine housing attaches to such a center housing wherein the turbine housing includes an inlet for exhaust gas and an outlet, a volute connected to the inlet and an integral outer nozzle wall adjacent the volute. Variable geometry may arise from a plurality of moveable vanes, for example, having rotation posts extending form a first surface substantially parallel to the outer nozzle wall wherein the posts are received in circumferentially spaced apertures in the outer nozzle wall. Often, each vane has an actuation tab that extends from a second surface of a vane distal the first surface. Positioning of the vanes may be achieved, in part, by a movable unison ring positioned intermediate the center housing and the vanes. In general, such a unison ring has a plurality of actuation slots oriented obliquely to a circumference of the unison ring for receiving the actuation tabs of the vanes. Such a unison ring may further have a radial slot that aids in movement of the unison ring and hence positioning of the vanes. While various examples refer to a turbocharger housing, such examples for sensing and/or control of geometry of a variable geometry turbine may optionally apply to a turbine housing that is not attached to a compressor wheel. For example, a turbine may have a shaft attached to a generator or other device wherein adjustment of geometry affects interaction between the turbine and the generator or other device. Such a turbine may include a turbine housing or a center housing.

As shown, the center housing 202 includes a center bore or opening 203 capable of carrying a bearing assembly for a turbine shaft, a crank shaft bore or opening 204 capable of carrying a crank shaft that can act to position a plurality of vanes, an electric actuator 205 having an electrical connector 206, a plurality of hydraulic fluid ports 207, and a piston casing 208 for housing a piston wherein movement of the piston causes movement of the crank shaft, for example, as described further below.

With respect to the aforementioned unison ring and vane system, such a crank shaft may include a pin for engaging the radial slot of the unison ring. Accordingly, movement of the crank shaft from a first position to a second position causes the pin to translate in the radial slot and impart force perpendicular to the radial slot to thereby urge rotational motion of the unison ring. Such rotational motion of the unison ring thereby causes the vane actuation tabs to traverse the actuation slots, for example, from a first end of the slots to a second end of the slots. Movement of the tabs positions the vanes and thereby effectively changes geometry of the turbine (e.g., flow geometry). Various features of the center housing 202 provide means for positioning vanes, for example, means for moving a crank shaft from a first position to a second position.

Figure 2B:
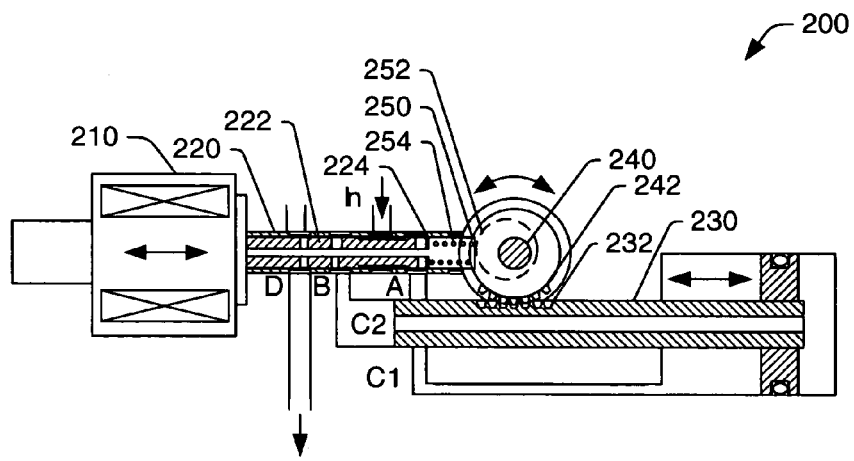
FIG. 2B is a cross-sectional view of a control system at least partially housed in the center housing of FIG. 2A.

FIG. 2B shows a detailed schematic of a control system 200 for a variable geometry unit of a variable geometry turbine, such as the variable geometry unit 130 of FIG. 1. Various features shown in the control system 200 correspond to means for positioning vanes associated with the center housing 202, for example, controlling vanes operatively coupled to a unison ring. As already mentioned, such a unison ring typically incorporates slots wherein each slot receives a respective tab of a vane. Rotation of the unison ring thereby provides for positioning of the vanes. In this example, the vanes define, in part, nozzles or flow paths and hence, positioning of the vanes determines the extent to which the nozzles or flow paths are open or closed.

The system 200 includes components capable of rotating such a unison ring. In particular, the system 200 includes an electric actuator 210 (e.g., a solenoid, etc.), a valve 220 having a stem 222 with a distal end 224, a piston shaft 230 having a rack gear 232, a rotatable crank shaft 240 having a pinion gear 242 that meshes with the rack gear 232, and a mechanism 250 having a cam 252 and a spring 254 wherein the cam 252 rotates with the rotatable shaft 240 and wherein the distal end 224 of the valve stem 222 and the cam 252 bias the spring 254. Position feedback of the rotatable shaft 240 occurs via the spring 254 as biased by various forces and according to current required by or provided to the electric actuator 210.

Such a system is disclosed and described in U.S. Pat. No. 6,269,642, to Arnold et al., and issued Aug. 7, 2001 ('642 patent), which is incorporated by reference herein for all purposes. According to the '642 patent, a solenoid serves as the electric actuator 210, which is capable of proportional servo 4-way control of the hydraulic valve 220. For example, if no current is applied to the solenoid, the channeled valve stem 222 is positioned so port A is open, port B (top of the piston) is connected to drain port D. When oil pressure is applied from the engine on which the turbocharger is mounted, oil pressure is directed from an inlet, labeled "in", through the port A and into the bottom of the piston through a conduit C1, thereby rotating the unison ring and placing the vanes in a fully open position. When current is applied to the solenoid, port A is closed, port A (bottom of the piston) is connected to drain D, port B opens and oil pressure is directed to the top of the piston through conduit C2 (a conduit in the piston shaft 230), moving the piston to the left thereby starting to rotate the unison ring in a manner to close the vanes (e.g., move to a closed position).

Figure 3:
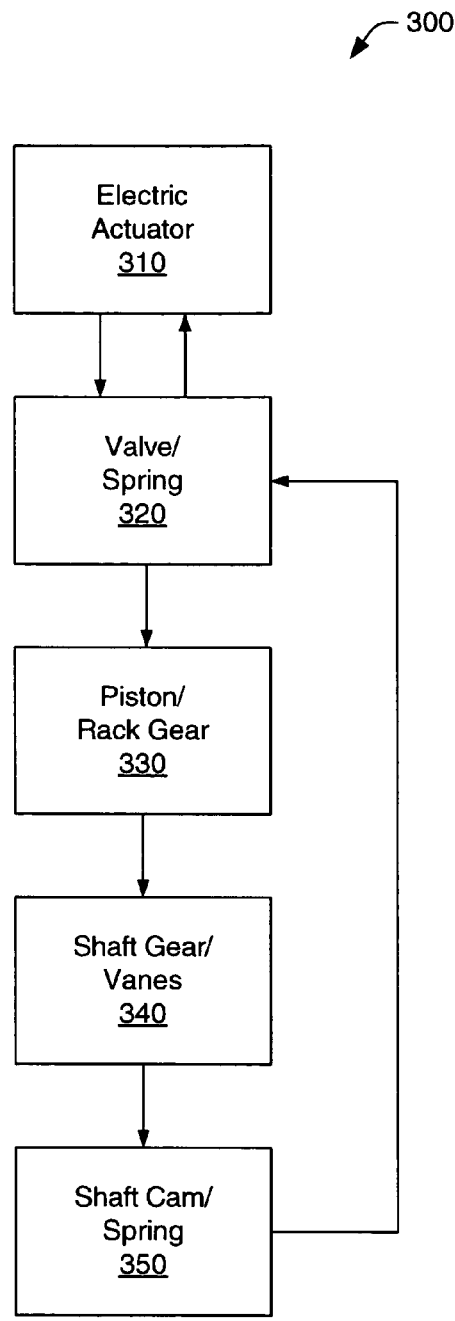
FIG. 3 is a block diagram of a control system and/or method corresponding to the control system of FIG. 2B.

FIG. 3 shows a block diagram of a control system and method 300 as used in conjunction with the system 200 of FIG. 2. The control system and method 300 includes an electric actuator block 310 that acts upon and receives feedback from a valve and spring block 320. For example, upon receipt of an electrical signal (e.g., current), the electric actuator 210 actuates the hydraulic valve 220 that is biased in part by the spring 254. Per the aforementioned example, a zero current to the electric actuator 210 corresponds to fully opened vanes whereas provision of some current to the electric actuator 210 corresponds to some degree of vane closure.

In the control system and method 300, the valve and spring block 320 receives input from the electric actuator block 310 and from a shaft cam and spring block 350 and it transmits output to the electric actuator block 310 and to a piston and rack gear block 330. As already described, in such a system the valve 220 directs hydraulic fluid (e.g., oil, etc.) to various ports and/or conduits, which, in turn, cause the piston shaft 230 to translate the rack gear 232. The piston and rack gear block 330 thus provides output to a shaft gear and vanes block 340. In this example, the rack gear 232 meshes with the pinion shaft gear 242 and thus translation of the piston shaft 230 causes rotation of the rotatable shaft 240. Rotation of the rotatable shaft 240, in turn, causes a change in the position of the vanes.

Rotation of the rotatable shaft 240 also causes a change in position of the cam 252. Thus, the shaft gear and vanes block 340 provides input to a shaft cam and spring block 350. For example, upon rotation of the rotatable shaft 240, the cam 252 either increases or decreases in radius with respect to the spring 254. In turn, the change in radius causes the spring 254 to experience a greater or a lesser force. Because the spring 254 applies force to the distal end 224 of the valve stem 222, the shaft cam and spring block 350 provides feedback or input to the valve and spring block 320. Thus, closed loop control is established in the control system and method wherein the mechanism 250 provides mechanical force feedback, which may be countered by electrical force of the electric actuator 210 and/or by hydraulic pressure associated with the piston shaft 230. In the system 300, the level of current provided to the electric actuator 210 indicates position of the cam 252 and hence position of the vanes.

Such a system and associated method exhibit time behavior, hysteresis and power consumption that can limit control of a variable geometry unit. For example, vane position cannot be determined until the electrical force, the mechanical force and the hydraulic force reach a steady-state. A delay in accurate knowledge of vane position can compromise or limit control. With respect to hysteresis, such a system may exhibit hystereis when it follows one path in positioning vanes from open to closed and follows another path in positioning vanes from closed to open. Such hysteresis may also effect steady-state conditions and compromise accurate knowledge of vane position. Regarding power consumption, current is required whenever the vanes are at least partially closed. Current can cause an electrical actuator to rise in temperature and thus cause an increase in resistance of internal parts. Thus, when the vanes are in a fully closed position (high current), the response of the actuator can differ substantially than when the vanes are in a fully open position (no current).

Figure 4:
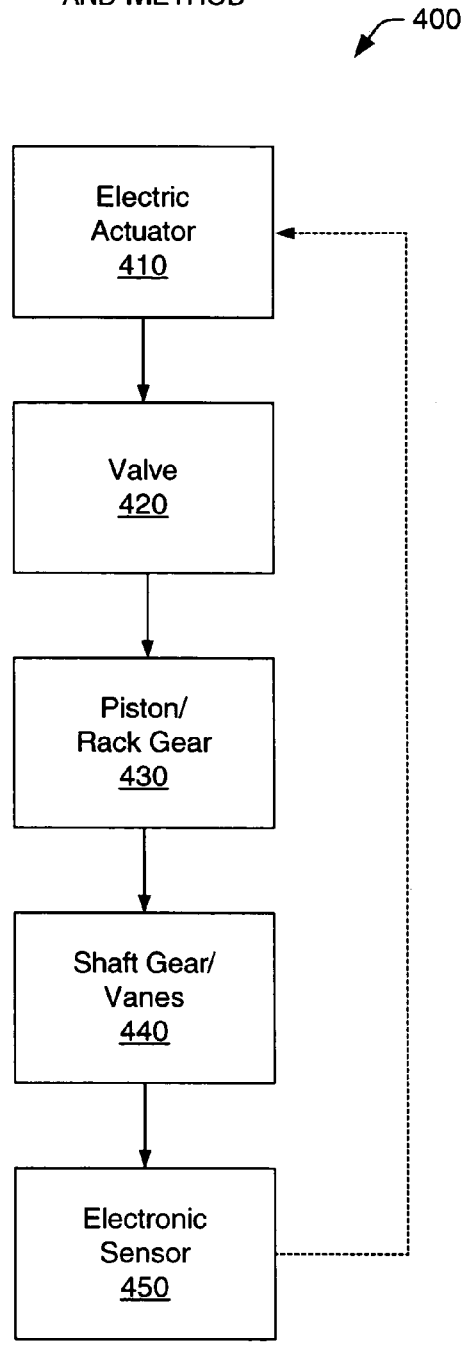
FIG. 4 is a block diagram of an exemplary control system and/or method that includes a hydraulic valve capable of adjusting, directly or indirectly, geometry of a variable geometry unit and a position sensor for sensing, directly or indirectly, geometry of the variable geometry unit.

FIG. 4 shows a block diagram of an exemplary control system and method 400. The exemplary control system and method 400 has time behavior, hysteresis and power consumption characteristics that allow for enhanced control compared to the control system and method 300. In particular, the exemplary control system and method 400 does not include a cam and spring mechanism for feedback and determination of vane position. Instead, the exemplary control system and method 400 uses an electronic sensor to determine vane position, directly or indirectly, and optionally provide feedback. Thus, such a control system and method can override vane position information, if desired; respond more quickly to changes in vane position; and/or eliminate a need for knowledge of actual current provided to an electric actuator.

According to the exemplary control system and method 400, an electric actuator block 410 provides output to a valve block 420 and optionally receives input from an electronic sensor block 450. For example, if the electric actuator block 410 desires fully closed vanes or fully open vanes, then input from the electronic sensor block 450 may be optional. In addition, if override of vane position information is desired, then input from the electronic sensor block 450 may be optional.

Upon input from the electric actuator block 410, the valve block 420 provides input to a piston and rack gear block 430, typically through adjusting flow of hydraulic fluid to one or more ports and/or conduits related to a piston having a rack gear or other mechanism to move a rotatable shaft. The piston and rack gear block 430 thereby provides input to a shaft gear and vanes block 440, typically via a mechanical link whereby a rack gear meshes with a shaft gear of a rotatable shaft and the rotatable shaft positions a unison ring or other mechanism for positioning one or more vanes. Finally, the shaft gear and vanes block 440 provides input to the aforementioned electronic sensor block 450. Various examples of electronic sensors are presented further below. While various examples pertain to use of a rotatable shaft for geometry adjustment or control, other examples may use a rotatable and/or translatable member for geometry adjustment or control. Exemplary sensors capable of sensing linear translation are described further below (e.g., consider the exemplary sensor of FIG. 10B wherein one or more of the supports are planar).

Figure 5A:
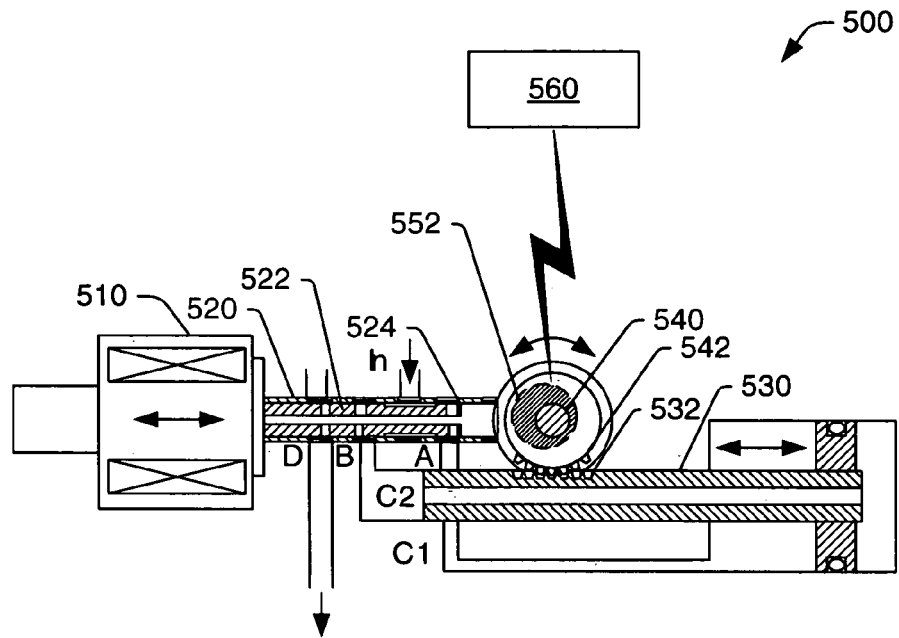
FIG. 5A is a cross-sectional view of an exemplary control system at least partially housed in a center housing.

FIG. 5A shows a detailed schematic of an exemplary control system 500 for a variable geometry unit of a variable geometry turbine, such as the variable geometry unit 130 of FIG. 1. The exemplary system 500 is suitable for controlling vanes, for example, operatively coupled to a unison ring. The control system 500 is optionally suitable for implementing the exemplary control system and method 400 of FIG. 4. Such an exemplary control system may be implemented in conjunction with the center housing 202. Such an implementation may require adjustments to ports or conduits in the center housing 202, depending on specifics of valve operation and/or sensor, if included.

The exemplary system 500 includes components capable of rotating a unison ring or otherwise positioning vanes or opening or closing nozzles of a variable geometry unit. The system 500 includes an electric actuator 510 (e.g., a solenoid, etc.), a valve 520 having a stem 522 with a distal end 524, a piston shaft 530 having a rack gear 532, a rotatable crank shaft 540 having a pinion gear 542 that meshes with the rack gear 532, and a cam 552 wherein the cam 552 rotates with the rotatable shaft 540.

The system 500 also includes an exemplary electronic sensor 560 for sensing position of one or more of the aforementioned components and/or position of one or more vanes. As described below, an exemplary electronic sensor may rely on electrical and/or magnetic fields or signals for sensing. Depending on arrangement of an exemplary sensor with respect to other components, position of the valve stem 522, the piston shaft 530, the rotatable shaft 540, the pinion gear 542, and/or the cam 552 may indicate vane position.

According to the exemplary system 500, the electric actuator 510 and the valve 520 do not interact with a mechanical feedback mechanism such as the spring and cam mechanism 250 of the system 200 of FIG. 2. Instead, feedback may be achieved via the electronic sensor 560. Further, the electric actuator 510 may act to position the valve stem 520 without having to compensate for or otherwise account for a mechanical feedback force. Thus, in the exemplary system 500, the valve stem 520 is mechanically isolated from the rotatable shaft 540 and the rotatable shaft 540 is mechanically isolated from the valve stem 520. In other words, there is no mechanical link between the valve stem 520 and the rotatable shaft 540 that provides feedback. In this example, a hydraulic link causes a change in the valve stem 520 to cause a change in position of the rotatable shaft 540. In some other examples, some type of mechanical connection may exist, however, feedback for vane position is provided at least in part by an electronic sensor.

While FIG. 5A shows a particular valve shaft and electric actuator, other components may be used. For example, various commercially available components may serve as the electric actuator 510 and/or the valve 520. Such commercially available components include oil control valves typically used for control of cam timing in internal combustion engines. For example, Denso International (Southfield, Mich.) markets an oil control valve; Delphi Corporation (Troy, Mich.) markets a four-way oil control valve; and Husco International, Inc. (Waukesha, Wis.) markets an oil control valve. Such valves typically operate using current signals less than several amperes.

Such actuator/valves are optionally controllable via pulse width modulation (PWM) signals. For example, an exemplary actuator may include a positive electrical terminal connected to a power supply and a negative or ground electrical terminal connected to a pulse width modulation controller, which, in turn, has a connection to a negative power terminal or a ground terminal.

Figure 5B:
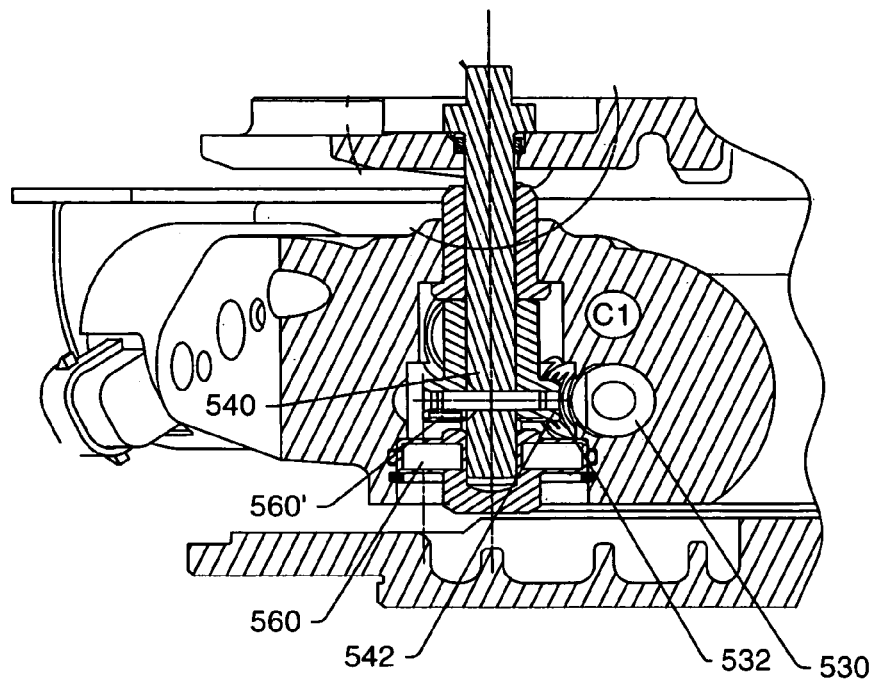
FIG. 5B is a cross-sectional view of the exemplary control system of FIG. 5A.

FIG. 5B shows another cross-sectional view of the exemplary control system 500 that presents details of the exemplary sensor 560. In this example, the sensor 560 has an additional component 560' that rotates upon rotation of the shaft 540 and/or the cam 552. The component 560' interacts with one or more other components of the sensor 560 that may be positioned proximate to the end of the shaft 540. In this example, the component 560' can rotate and the other components of the sensor 560 sense the rotation.

Figure 6A:
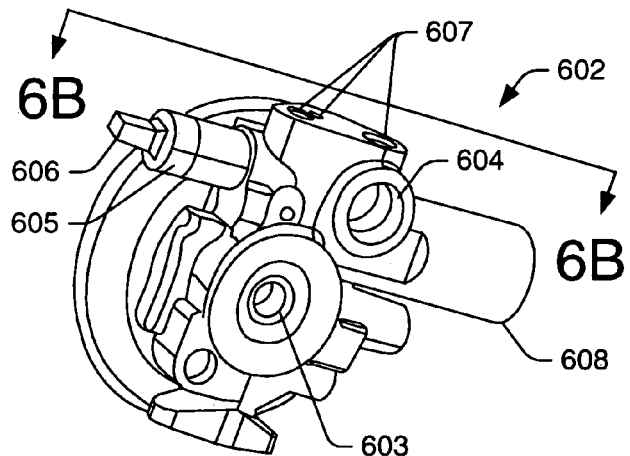
FIG. 6A is a perspective view of an exemplary center housing for a variable geometry turbine that includes an oil control valve.

FIG. 6A shows a perspective view of an exemplary center housing 602 that includes an oil control valve 605 such as a valve marketed by Husco International, Inc. As shown, the oil control valve 605 includes a connector 606 for communication of information and/or power. Various features of the center housing 602 correspond to those described with respect to the center housing 202 of FIG. 2. For example, the housing 602 includes a bore or opening 603 for receiving a turbine shaft, a bore or opening 604 for receiving a rotatable crank shaft, various ports 607 for hydraulic fluid, and a casing 608 for a piston. As described herein, a bore generally traverses a dimension of a housing and an opening generally traverses a dimension or part of a dimension of a housing.

Figure 6B:
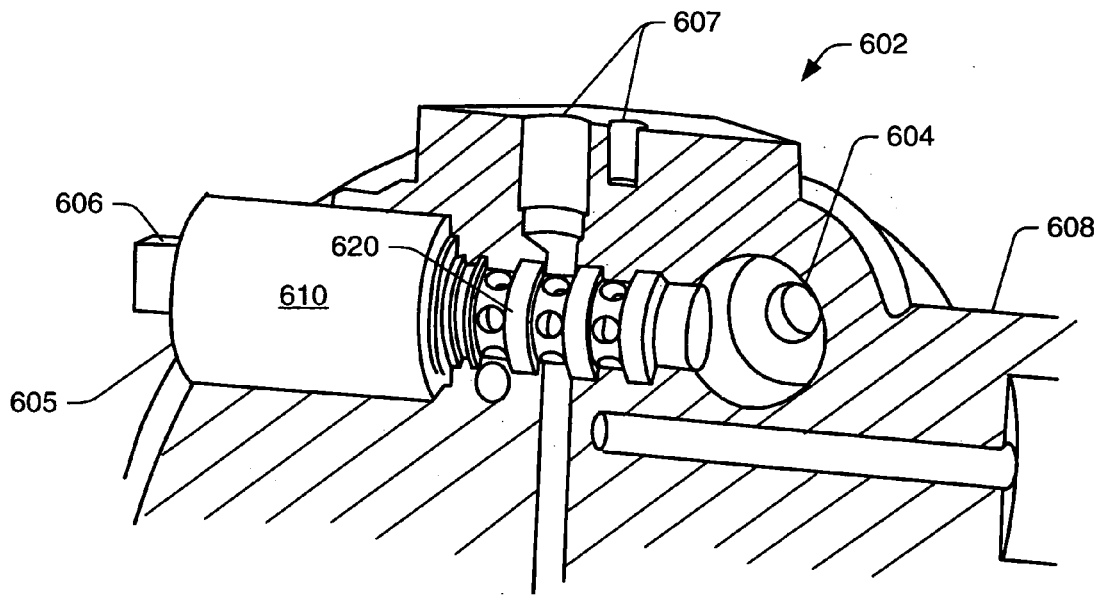
FIG. 6B is a cutaway view of the exemplary center housing of FIG. 6A that shows an exemplary oil control valve.

FIG. 6B shows a cutaway view of the exemplary center housing 602 of FIG. 6A. The oil control valve 605 includes an electric actuator 610 and a valve stem 620. The electric actuator 610 allows for control of the valve stem 620. As shown, the valve stem 620 includes various orifices to capable of selectively controlling hydraulic fluid paths, which may be in communication with ports and/or conduits. In general, control of such paths determines hydraulic pressure experienced by a piston cased in the casing 608. In turn, movement of the piston causes movement of a shaft operably connected, directly or indirectly, to variable geometry elements (e.g., vanes, etc.) of a variable geometry unit.

Figure 7:
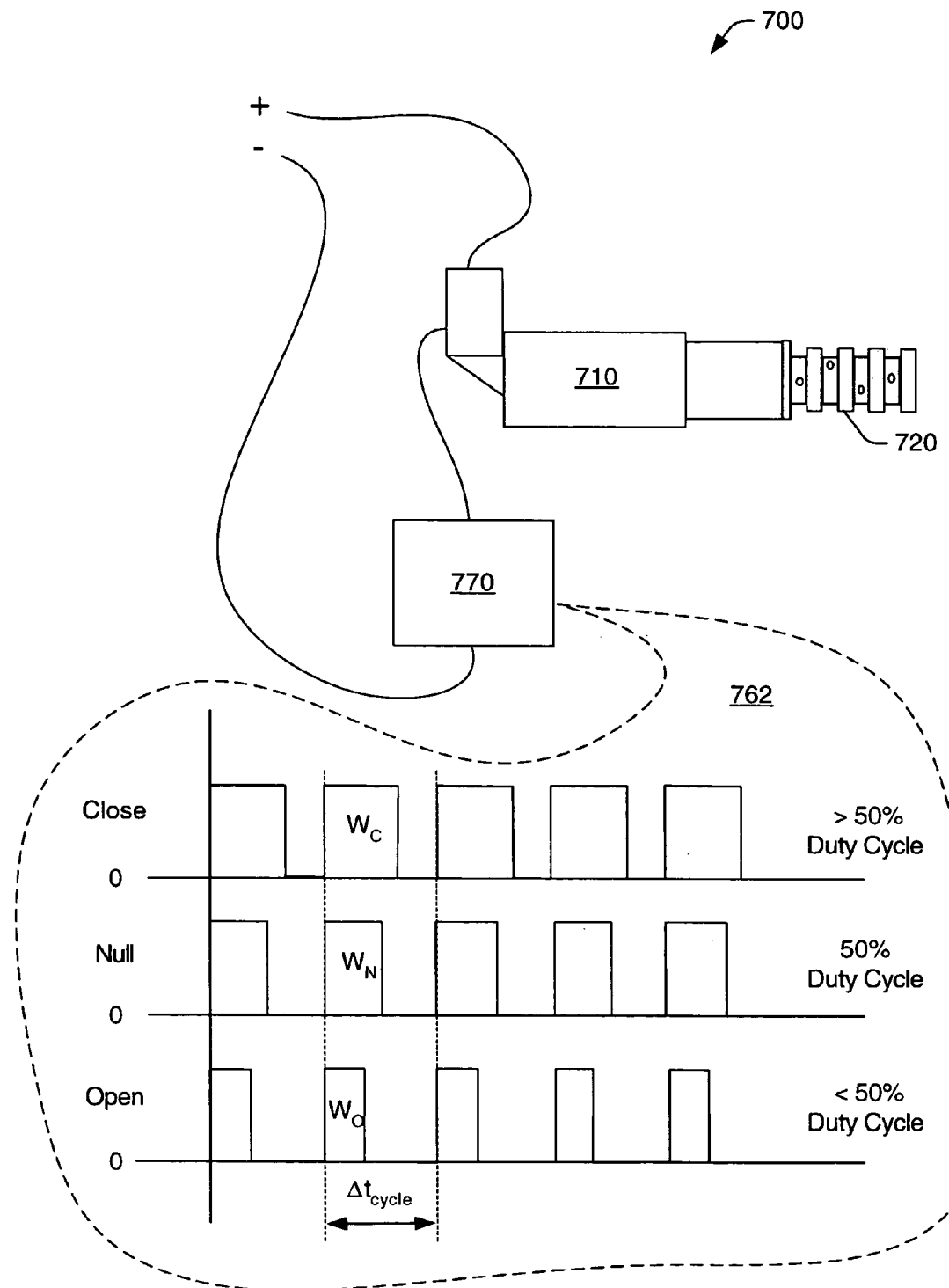
FIG. 7 is an exemplary control system that includes pulse width modulation.

FIG. 7 shows an exemplary system 700 that includes an electric actuator 710 operably connected to a hydraulic valve 720 and a pulse width modulation controller 770 capable of controlling input to the electric actuator 710. The electric actuator 710 and the hydraulic valve 720 are optionally parts of a cam phaser control valve suited for use in vane control. For example, a cam phaser valve marketed by Delphi Automotive Systems may be used for such vane control.

Various Delphi valves include a four-way spool valve to direct flow of oil toward a front or rear of a piston in a cam phaser. Such a valve may be actuated by a PWM signal from an engine control unit. The control valve typically directs flow of oil to either side of a phaser piston depending on the duty cycle of the PWM input. When the duty cycle to the valve is zero (e.g., de-energized), the spool is positioned so that oil supply pressure is directed to the rear of the piston. As the duty cycle is increased, the spool valve moves forward, gradually cutting supply pressure from the rear of the piston. Before the supply pressure opens up to the front of the phaser, there is a region where neither side of the piston receives actuating pressure.

Various Delphi valves are designed to be in a nominal holding position at a duty cycle of 50% (0.5). As the duty cycle is increased toward 100%, the supply is directed to the front, moving the phaser against the spring. The holding position is the single most important parameter in modeling this system. The holding position of the spool valve is a very small mechanical region. Thus, the duty cycle which corresponds to this mechanical position can vary according to conditions.

In the example of FIG. 7, the hydraulic valve 720 causes one or more variable geometry elements (e.g., vanes, etc.) to move to a more open position when the duty cycle of the pulse width modulated signal exceeds a predetermined value (e.g., approximately 50%, etc.); causes the one or more variable geometry elements to remain at a present position when the duty cycle of the pulse width modulated signal is at the predetermined value (e.g., approximately 50%, etc.); and causes the one or more variable geometry elements to move to a more closed position when the duty cycle of the pulse width modulated signal falls below the predetermined value (e.g., approximately 50%, etc.). In other examples, the open and close states may be reversed.

In the example of FIG. 7, a change in pulse width is used to change duty cycle. Note that the pulse width for closing, $W_C$, is greater than the pulse width for the null position $W_N$, which is greater than the pulse width for opening $W_O$.

Further, in this example, the cycle length, $\Delta t_{cycle}$, is the same for the opening signal, the null signal and the closing signal. While this particular example uses a single and/or constant frequency (e.g., $1/\Delta t_{cycle}$) other examples may use more than one frequency and/or varying frequencies. In various examples, a constant, non-zero duty cycle maintains a valve (e.g., valve stem, etc.) in a substantially steady position (e.g., null position).

Pulse width modulation control, depending on frequency, amplitude, etc., may also act to reduce static friction. Static friction is a force that opposes motion between two surfaces in contact with each other; thus, static friction opposes an applied force. The following equation is often used to describe static frictional and its relationship to a normal force via a friction coefficient $\mu$: $Fs=\mu F_n$. In contrast, kinetic frictional force opposes motion that acting against it and is usually less than the static friction force. An exemplary method includes pulse width modulation control of an electric actuator coupled to a hydraulic valve stem for a variable geometry turbine wherein pulse width modulation control reduces or eliminates static friction. According to such an exemplary method, pulse width modulation control uses a signal that causes the electric actuator to vibrate a movable component, such as a valve stem, of the hydraulic valve. For example, a signal having a frequency in a range from approximately 80 Hz to approximately 150 Hz can reduce or eliminate static friction such as that encountered in the conventional control system 200, 300. With respect to signal frequency, in situ testing may occur to determine which frequency or frequencies provide the best response. Thus, an exemplary method includes implementing an electric actuator and hydraulic valve in a variable geometry turbine fitted to an internal combustion engine and then determining a frequency or frequencies for a control signal wherein the frequency or frequencies reduce static friction or optimally reduce static friction associated with one or more moving parts of the hydraulic valve.

An exemplary method of controlling a variable geometry unit includes providing, to an electric actuator coupled to a hydraulic valve, a pulse width modulated signal having a current of less than approximately 1 ampere and/or a frequency in a range from approximately 80 Hz to approximately 150 Hz.

Figure 8:
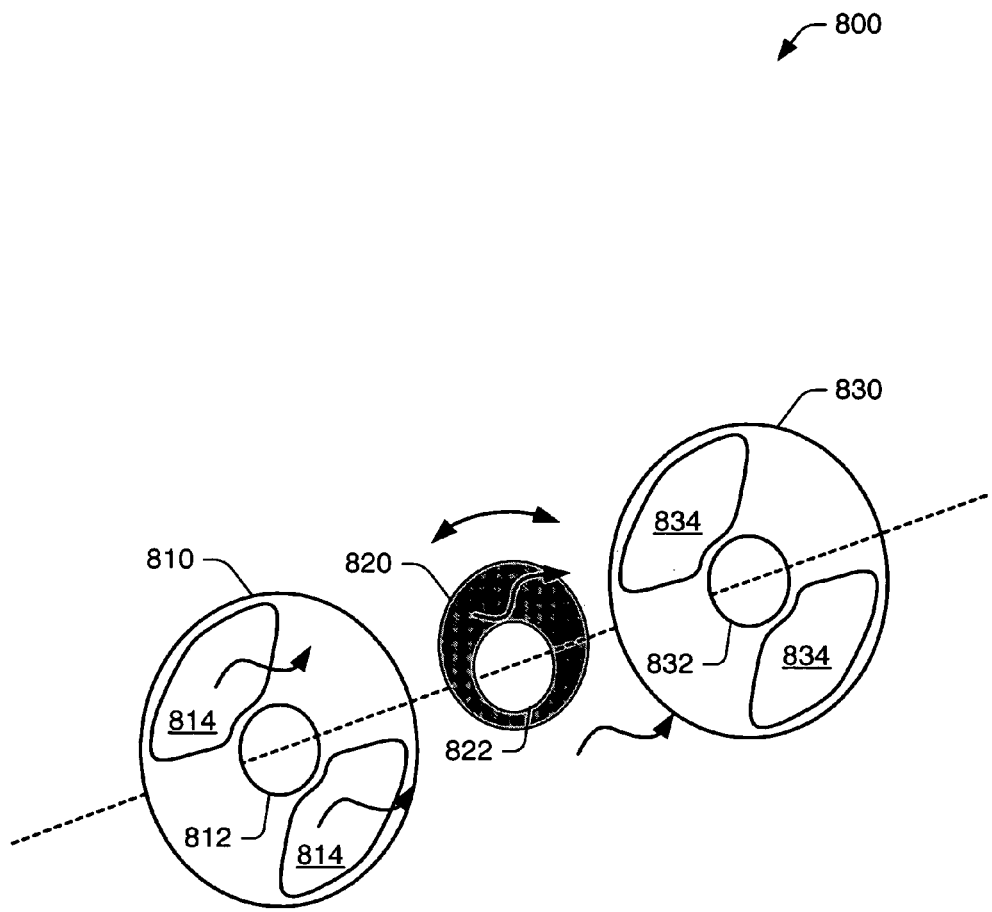
FIG. 8 is an exploded view of various components of or associated with an exemplary position sensor.

FIG. 8 shows an exemplary sensor 800 capable of sensing position of a rotatable shaft, such as the shaft 540 of the exemplary system 500. In this example, the sensor 800 includes a transmitter 810 for transmitting radiation, an attenuator 820 for altering radiation, and a receiver 830 for receiving radiation. Such a sensor is at times referred to as a transceiver sensor. The transmitter 810 includes an aperture 812 and one or more antennae 814 (e.g., a loop antennae, etc.) for transmitting radiation. The aperture 812 allows for attaching the transmitter 810 to a shaft or passing a shaft through the transmitter 810. The receiver 830 includes an aperture 832 and one or more antennae 834 (e.g., a loop antenna, etc.) for receiving radiation. The aperture 832 allows for attaching the receiver 830 to a shaft or passing a shaft through the receiver 830. The attenuator 820 includes an aperture 822 for attaching the attenuator 820 to a shaft or passing a shaft through the deflector 820. In an exemplary implementation, the deflector 820 attaches to a shaft that passes through the transmitter 810 and/or receiver 830. Thus, as the shaft rotates, the attenuator 820 changes position with respect to radiation transmitted by the transmitter 810 and thus alters radiation received by receiver 830. The term radiation generally applies to particle or wave radiation (e.g., electromagnetic waves); however, in some examples, changes in a magnetic field may be used to determine position wherein an electrical field component may be insignificant or not significant to position determinations.

According to the exemplary sensor 800, variable attenuation characteristic of the received radiation is related to the position of the attenuator 820 with reference to the transmitter 810 and the receiver 830. While in theory, a single channel is adequate to detect and provide position and/or angular displacement information, performance is enhanced through use of multiple channels.

An exemplary sensor may use multiple channels and an amplitude-to-phase conversion technique to convert radiation amplitude information into phase information. According to such a sensor, the sum of the received radiation signals may be converted into a single sinusoidal waveform through a summing amplifier such that the phase shift changes of the radiation signal are proportional to the degree of interference (e.g., angular position). In this example, radiation signals received by the multiple channels are ratiometric with respect to one another; thus, variations in the transmitted radiation signal amplitude will not affect phase information.

Figure 9A:
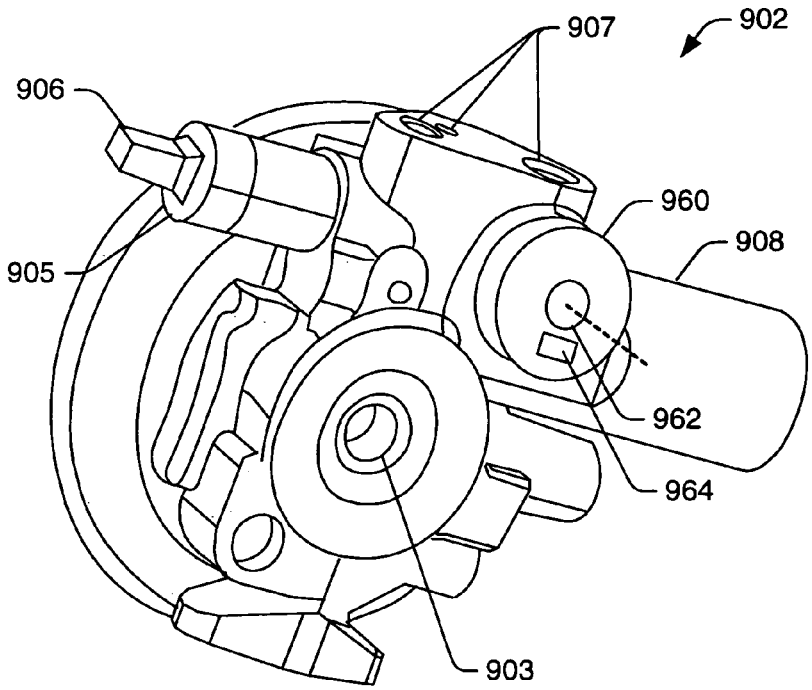
FIG. 9A is a perspective view of an exemplary center housing for a variable geometry turbine that includes an exemplary position sensor.

While FIG. 8 shows the sensor 800 as having an attenuator disposed between a transmitter and a receiver; another exemplary sensor has a transmitter adjacent to a receiver and an attenuator removed from the transceiver pair. FIG. 9A shows an exemplary center housing 902 that includes an exemplary position sensor 960. The sensor 960 may serve as the sensor 560 of the exemplary control system 500 of FIG. 5. In this example, the position sensor 960 is positioned adjacent to a bore or opening for a rotatable shaft capable of positioning geometry elements (e.g., vanes, etc.). The position sensor 960 optionally includes a center aperture 962, which may receive an end of the rotatable shaft, and a connector 964 for electrical power and/or transmitting a position signal.

Figure 9B:
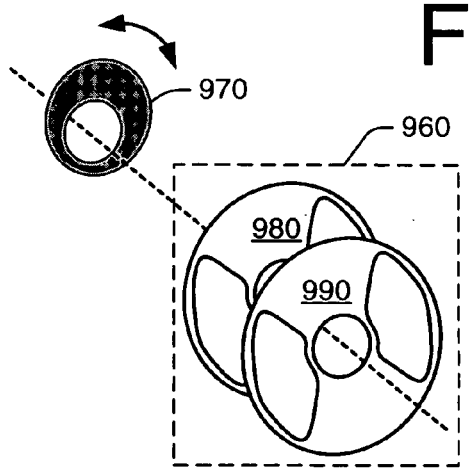
FIG. 9B is an exploded view of various components of or associated with the exemplary position sensor of FIG. 9A.

FIG. 9B shows an exploded view of components associated with the sensor 960. In this example, the sensor 960 includes a transceiver capable of transmitting and receiving radiation. For example, a first antenna 980 may transmit radiation while a second antenna 990 may receive radiation. In other instances, with a switching circuit, a single antenna may serve to transmit radiation and to receive radiation. An asymmetric reflector 970 may serve as an attenuator that reflects radiation emitted by the first antenna 980, which, in turn, may be received by the second antenna 990. The asymmetric reflector 970 may be part of, applied to, attached to, etc., the rotatable crank shaft 540 (e.g., the cam 552) of the control system 500 of FIG. 5. Accordingly, rotation of the crank shaft 540 causes the rotation of the asymmetric reflector 970. Radiation reflected by the reflector 970 is then received by the sensor 960 and translated into a position signal. An exemplary controller may receive the position signal and determine a new vane position based at least in part on such information.

Figure 9C:
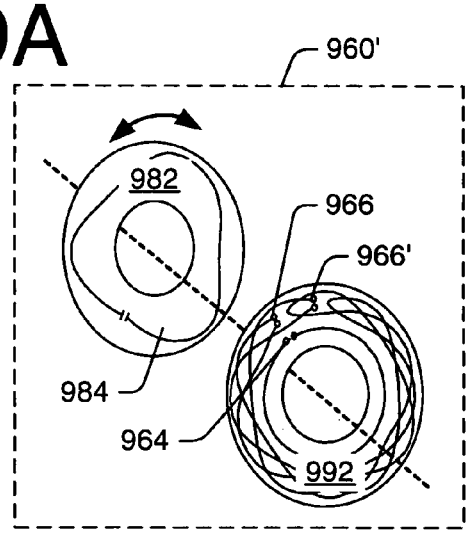
FIG. 9C is an exploded view of various components of or associated with another exemplary position sensor such as that of FIG. 9A.

FIG. 9C shows another exemplary sensor 960'. Some components of such a sensor are disclosed in U.S. Pat. No. 5,815,091, to Dames et al., issued Sep. 29, 1998, which is incorporated by reference herein for purposes related to sensors and sensing. The sensor 960' includes a support 992 upon which spiral windings 966 and 966' are wound in a substantially circular fashion wherein each spiral winding has three periods. The support 992 also includes an excitation loop 964 capable of exciting a resonant circuit mounted on another support. In this example, a support 982 includes a resonant circuit 984; however, in other examples, such a circuit is optionally part of, applied to, attached to, etc., a rotatable crank shaft such as the shaft 540 of FIG. 5. Accordingly, rotation of the crank shaft 540 causes the rotation of the resonant circuit 984. As already mentioned, some other examples may rely on a translatable and/or rotatable shaft (see, e.g., FIG. 10B for a sensor arrangement optionally suitable for sensing translation of a member).

Figure 9D:
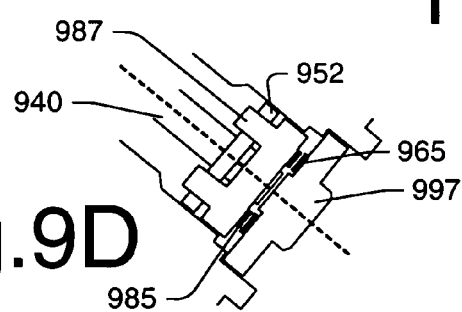
FIG. 9D is a schematic of an exemplary sensor arrangement with respect to a rotatable shaft and a housing.

FIG. 9D shows an example where one or more circuits 985 (e.g., one or more of the circuits 984, 964, 966, 966', etc.) are mounted to a rotatable support or member 987 and one or more circuits 965 (e.g., one or more of the circuits 984, 964, 966, 966', etc.) are mounted to a stationary support or member 997, which optionally includes an aperture (e.g., consider the aperture 962). The member 987 may have one or more prongs or other attachment mechanisms for mounting to a component 952 of a vane positioning system (e.g., a cam, a gear, etc.). The attachment mechanism may allow for adjustments with respect to an outer member (e.g., the outer member 997). Such adjustments may allow for calibration or other adjustments related to operation of the sensor. In an alternative example, an inner stationary member that includes one or more circuits and an outer rotatable member that includes one or more circuits may be used.

FIG. 9D shows the integration of a rotary contact-less position sensor into the center housing of a turbocharger. This arrangement offers a small overall package that optionally fits into an existing turbocharger housing opening or envelope, has few parts and can directly couple to a component responsible for vane positioning and/or a component directly responsible for rotation of a unison ring mounted proximate to a turbine. Further, calibration of such an exemplary sensor may occur at or near the end of a turbocharger production line. An exemplary sensor may be constructed from material capable of withstanding operational temperatures associated with a turbocharger housing. A connector for electrical connections may also be constructed from material capable of withstanding operational temperatures associated with a turbocharger housing.

As described, the exemplary sensor 960' includes a sensing circuit capable of sensing alternating magnetic fields via the series connected conductive loops 966, 966' wherein any EMF induced in one loop by an alternating magnetic field is opposed by EMF induced in an adjacent connected loop. In this example, the excitation circuit 964 or energizing circuit can energize an alternating magnetic field. Further, the resonator circuit 984 can couple electromagnetically to the sensing circuit (e.g., including loops 966, 966') and the energizing circuit 964. Upon resonance of the resonator circuit 984, an alternating magnetic field is generated which can induce an alternating signal in the sensing circuit (e.g., including loops 966, 966'). To aid in determining position, electromagnetic coupling between the resonator circuit 984 and sensing circuit (e.g., the loops 966, 966') may vary as a sinusoidal function of their relative positions. Other arrangements are also possible for using a transceiver and reflector, resonator, attenuator, etc. In various examples, a reflector, a resonator or an attenuator move with respect to a fixed transceiver. A transceiver may include an excitation or energizing circuit as a transmitter of radiation. As described herein, an electromagnetic field may optionally have an insignificant electrical field component (e.g., primarily magnetic field) and/or an electrical field component that is not significant for position determinations.

Another exemplary sensor which has found use in a turbocharger variable geometry actuation system is marketed by Hella KG Hueck & Co. (Lippstadt, Germany) as a non-contacting, inductive sensor. Such a sensor is based on an inductive principle and includes a stator and a rotor. The stator includes an excitation coil, receiver coils and electronics for signal processing. In this sensor, the rotor is passive and has one closed conductive loop. Accordingly, inductive coupling between the excitation coil, the rotor loop and the receiver coils leads to a ratio-metric signal that depends on angular position of the rotor. While the Hella sensor includes an application-specific integrated circuit (ASIC), other exemplary sensors described herein may include one or more ASICs as well, for example, to control transmitter, receiver, signal processing, etc.

An exemplary sensor optionally uses non-contact sensing technology based on a magnetic principle which provides for coupling between a sensing element and a moving component. For example, such an exemplary sensor may include a track board assembly or support and a target resonator assembly wherein the track board assembly is stationary and contains the sensing element and electronics and the target resonator is a passive device and is attached to the moving component or a support on or in the moving component. In this example, operation relies on a track board with an exciter coil that emits a 2 megahertz signal that is received by the target which, in turn, resonates at an exciter frequency. The magnetic field from the resonating target, in turn, couples back to the track board. Further, the track board may incorporate circuits having sine and cosine patterns that can be activated by the magnetic field from the resonator. In this manner, depending on the position of the resonating target, the amplitude of the sine and cosine circuits will vary. The varying amplitude can then be converted to position and/or angle by calculating arctan function of the two signals. An exemplary sensor optionally uses a wrapped linear sensor and/or target, a sector spiral sensor and/or target, an embedded sensor and/or target, etc.

Figure 10:
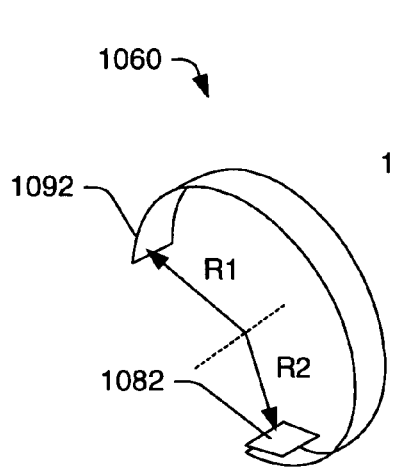
FIG. 10A shows an exemplary sensor arrangement that includes one or more circuits capable of conforming to an arc.
FIG. 10B shows an exemplary sensor arrangement that includes one or more planar circuits.
FIG. 10C shows an exemplary electronics system capable of being used with the sensor arrangements of FIGS. 10A, 10B and optionally other arrangements.
Figure 10:
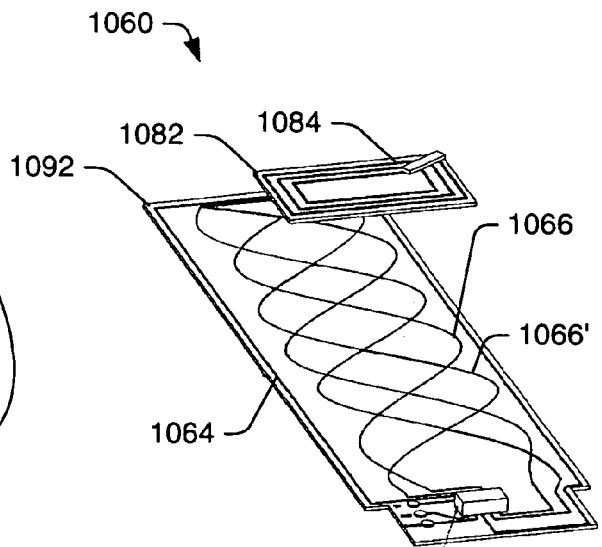

FIG. 10A shows an exemplary sensor arrangement 1060 that includes one or more supports capable of including circuits and conforming to an arc. A first support 1092 may form an arc and be positioned with respect to an inner surface of a cylindrical wall, to outer surface of a cylinder, etc. A second support 1082 may be planar and/or form an arc and be positioned with respect to an inner surface of a cylindrical wall, to outer surface of a cylinder, etc. In the arrangement 1060, the first support 1092 includes a radius R1 and the second support 1082 is positioned at a radius R2 that is less than the radius R1. In one example, the support 1082 is mounted on or in a rotatable shaft and the support 1092 is mounted on or in a wall that at least partially surrounds a portion of the rotatable shaft. In this example, rotation of the shaft causes a change in position of the supports with respect to each other. Where a first radius for a first circuit and a second radius for a second circuit may be defined with respect to a rotational axis of a rotatable shaft, the difference between the radii is optionally in a range from about 0.1 mm to about 10 mm and preferably less than about 5 mm (e.g., |R1−R2|<~5 mm). For a translatable member for adjusting geometry, a similar difference between two or more movable circuits may apply.

FIG. 10B shows the exemplary sensor arrangement 1060 mapped to a planar view wherein each support includes one or more circuits. Of course, a planar arrangement may be optionally used for sensing position of a translatable member. The support 1092 includes spiral windings 1066 and 1066' and an excitation loop 1064 capable of exciting a resonant circuit mounted on another support. In this example, the support 1082 includes a resonant circuit 1084; however, in other examples, such a circuit is optionally part of, applied to, attached to, etc., a rotatable shaft such as the shaft 540 of FIG. 5. Accordingly, in such an example, rotation of the crank shaft 540 would cause the rotation of the resonant circuit 1084. Where the support 1092 has an arcuate shape and a radius greater than that of a rotatable shaft that includes the resonant circuit 1084, rotation of the shaft can be tracked by appropriate electronics.

Figure 10C:
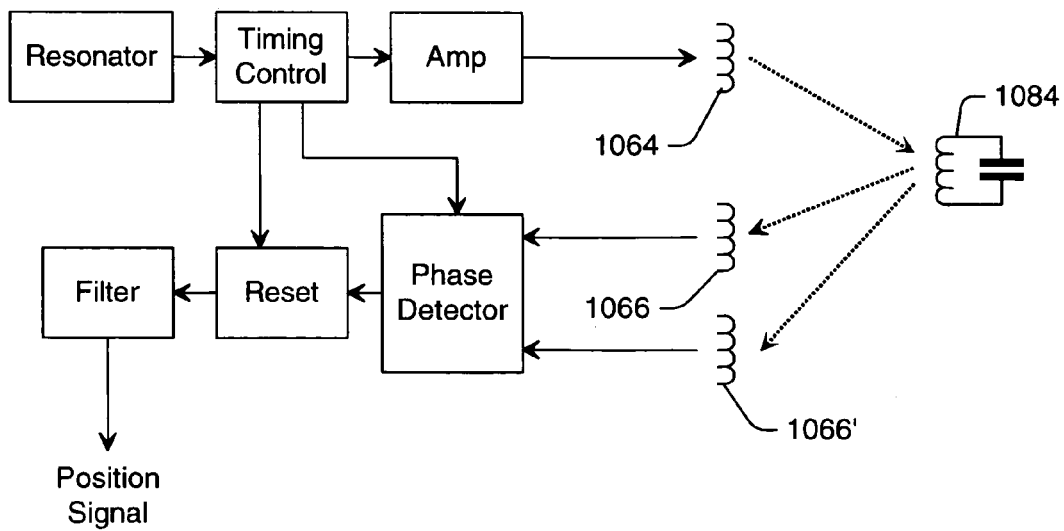

FIG. 10C shows an exemplary electronics system 1098 capable of being used with the sensor arrangements of FIGS. 10A, 10B and optionally other arrangements. According to the system 1098, an amplifier outputs energy to the excitation circuit 1064 wherein energy emitted by the excitation circuit 1064 can be received by and/or altered by the resonator circuit. In turn, the spiral windings 1066, 1066 interact with energy and provide information to a phase detector, which may rely on a timing controller and/or a resonator. A reset may act to reset various electronics periodically, after a change in position (e.g., phase), etc. A filter may filter information from the phase detector and/or the reset and provide an output indicative of a relationship between the circuits 1066, 1066' and the circuit 1084. For example, the filter may provide an analog voltage in a range suitable for use with automotive electronics.

An exemplary turbocharger housing includes an arcuate support for supporting one or more circuits that are capable of interacting with one or more other circuits positioned in or on a rotatable shaft. An exempalry turbocharger housing includes one or more spiral windings capable of supplying phase information to a phase detector and positioned proximate to an opening capable of receiving a member selected from the group consisting of a rotatable member, a translatable member and a translatable and rotatable member. Such an exemplary turbocharger optionally includes a member positioned at least partially in the opening wherein the member comprises a resonator circuit positioned thereon or therein. Such a member may rotate and/or translate to adjust or rotate and/or translate in response to adjustment of a variable geometry unit and/or element of a variable geometry turbine.

An exemplary turbocharger housing includes one or more resonator circuits capable of interacting with one or more spiral windings and positioned proximate to an opening capable of receiving a rotatable member (e.g., a shaft, etc.), a translatable member or a translatable and rotatable member. Such an exemplary turbocharger housing optionally includes a member positioned at least partially in the opening wherein the member comprises the one or more spiral windings positioned thereon or therein. Such a member may rotate and/or translate to adjust or rotate and/or translate in response to adjustment of a variable geometry unit and/or element of a variable geometry turbine.

Figure 11:
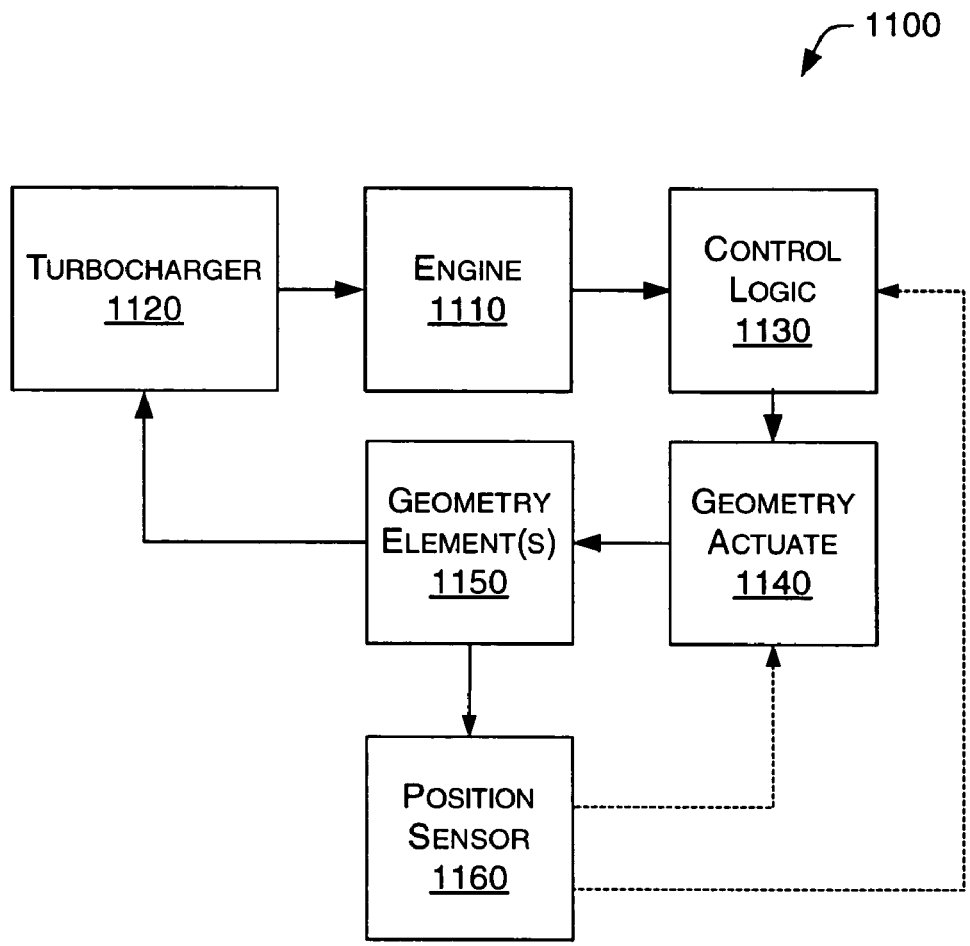
FIG. 11 is a block diagram of an exemplary control system and/or method for controlling a variable geometry unit of a turbocharger.

FIG. 11 shows an exemplary system and/or method 1.100 for controlling geometry elements of a variable geometry unit. An engine block 1110 provides, via sensors or other means, information to a control logic block 1130. The control logic block 1130 may also receive user input (e.g., information related to braking, acceleration, deceleration, etc.). The control logic block 1130 determines desirable engine operation conditions based at least in part on the information received from the engine block 1110 and optionally based in part on information received from a position sensor block 1160 and/or user input. The control logic block 1130 then outputs information to a variable geometry actuate block 1140 to control a variable geometry actuator capable of adjusting exhaust flow to a turbine. The variable geometry actuate block 1140 commands an actuator to adjust, for example, a variable geometry unit (e.g., VGT, nozzle(s), vane(s), etc.) to a desirable geometry. In a variable geometry block 1150, a variable geometry element or elements associated with the variable geometry unit adjust to the desirable geometry, which, in turn, effects operation of the turbocharger block 1120. Operation of the turbocharger block 1020 further effects operation of the engine block 1110, thereby forming a control system and/or method having one or more closed loops.

An exemplary method includes determining one or more control parameters based at least partially on engine operating conditions, position of one or more geometry elements (e.g., vanes, etc.) of a variable geometry unit and/or user input/demand.

An exemplary method for controlling a variable geometry turbine includes providing a pulse width modulated signal to a control valve having a valve stem; in response to the providing, moving the valve stem; in response to the moving, flowing hydraulic fluid; in response to the flowing, translating a piston; in response to the translating, rotating a crank shaft wherein the crank shaft is mechanically isolated from the valve stem; in response to the rotating, adjusting one or more geometry elements of the variable geometry turbine; and determining geometry based at least in part on angular position of the crank shaft.

Although some exemplary methods, devices, systems, etc., have been illustrated in the accompanying Drawings and described in the foregoing Detailed Description, it will be understood that the methods, devices, systems, etc., are not limited to the exemplary embodiments disclosed, but are capable of numerous rearrangements, modifications and substitutions without departing from the spirit set forth and defined by the following claims.

What is claimed is:

1. A control system for a variable geometry turbine comprising:
    a control valve that includes an electric actuator operatively coupled to a valve stem;
    a piston operatively coupled to one or more hydraulic fluid paths controlled by the control valve and including a piston shaft;
    a rotatable shaft operatively coupled to the piston shaft and mechanically isolated from the valve stem and capable of adjusting geometry of the variable geometry turbine; and
    an electronic sensor capable of sensing an angular position of the rotatable shaft.

2. The control system of claim 1, wherein the control valve is suitable for use in controlling cam timing of an internal combustion engine.

3. The control system of claim 1, wherein the electronic sensor includes a resonator circuit.

4. The control system of claim 3, wherein a rotation of the rotatable shaft causes rotation of the resonator circuit.

5. The control system of claim 1, wherein a closed control loop exists between a control signal provided to the control valve and an output signal of the electronic sensor.

6. The control system of claim 5, wherein the closed control loop relies on one or more parameters related to operating conditions of an internal combustion engine.

7. The control system of claim 1, wherein the electric actuator actuates the valve stem based at least in part on a pulse width modulated signal.

8. The control system of claim 7, wherein the pulse width modulate signal has a frequency in a range from approximately 80 Hz to approximately 150 Hz.

9. The control system of claim 7, wherein the pulse width modulated signal reduces static friction of the valve stem.

10. A method for controlling a variable geometry turbine comprising:

providing a pulse width modulated signal to a control valve having a valve stem;

in response to the providing, moving the valve stem;

in response to the moving, flowing hydraulic fluid;

in response to the flowing, translating a piston;

in response to the translating, rotating a crank shaft wherein the crank shaft is mechanically isolated from the valve stem;

in response to the rotating, adjusting one or more geometry elements of the variable geometry turbine; and determining geometry based at least in part on angular position of the crank shaft.

11. The method of claim 10, wherein the moving depends on a duty cycle of the pulse width modulated signal.

12. The method of claim 10, wherein the providing provides a signal having a frequency in a range from approximately 80 Hz to approximately 150 Hz.

13. The method of claim 10, wherein the determining includes receiving one or more signals from a resonator circuit that rotates in response to the rotating.

14. The method of claim 13, wherein at least one of the one or more signals varies as a sinusoid.

* * * * *